United States Patent
Mun et al.

(10) Patent No.: US 10,073,519 B2
(45) Date of Patent: Sep. 11, 2018

(54) APPARATUS AND METHOD FOR PROVIDING INFORMATION BY RECOGNIZING USER'S INTENTIONS

(71) Applicant: Samsung Electronics Co., Ltd., Suwon-si (KR)

(72) Inventors: Min-Young Mun, Seoul (KR); Jae-Mo Sung, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 39 days.

(21) Appl. No.: 14/335,977

(22) Filed: Jul. 21, 2014

(65) Prior Publication Data

US 2015/0054731 A1 Feb. 26, 2015

(30) Foreign Application Priority Data

Aug. 26, 2013 (KR) .................. 10-2013-0101318

(51) Int. Cl.
*G06F 3/01* (2006.01)
*G02B 27/01* (2006.01)

(52) U.S. Cl.
CPC ........... *G06F 3/013* (2013.01); *G02B 27/017* (2013.01); *G06F 3/017* (2013.01); *G02B 2027/0178* (2013.01); *G02B 2027/0187* (2013.01)

(58) Field of Classification Search
CPC ...................................................... G06F 3/013
See application file for complete search history.

(56) References Cited

U.S. PATENT DOCUMENTS

| | | | |
|---|---|---|---|
| 6,102,870 A | 8/2000 | Edwards | |
| 8,368,794 B2 | 2/2013 | Sako et al. | |
| 2009/0278766 A1 | 11/2009 | Sako et al. | |
| 2011/0175932 A1* | 7/2011 | Yu | G06F 3/048 345/661 |
| 2012/0075168 A1* | 3/2012 | Osterhout | G02B 27/017 345/8 |
| 2012/0154557 A1* | 6/2012 | Perez | H04N 21/25891 348/53 |
| 2012/0293548 A1 | 11/2012 | Perez et al. | |
| 2014/0188497 A1* | 7/2014 | Roscoe | G06F 19/3431 705/2 |
| 2015/0026415 A1* | 1/2015 | Clausen | G06F 12/0862 711/137 |
| 2015/0153570 A1* | 6/2015 | Yamamoto | H04M 1/72563 345/184 |

FOREIGN PATENT DOCUMENTS

| | | |
|---|---|---|
| JP | 2009-296228 A | 12/2009 |
| JP | 2010-134152 A | 6/2010 |
| KR | 10-2009-0050069 | 5/2009 |
| KR | 10-2009-0060421 A | 6/2009 |

* cited by examiner

*Primary Examiner* — Alexander Eisen
*Assistant Examiner* — Cory Almeida
(74) *Attorney, Agent, or Firm* — NSIP Law

(57) ABSTRACT

A mobile device and operating method provides information by automatically recognizing a user intention. The mobile device includes a sensor configured to sense a user's eye movement, an event detector configured to detect an event by inferring a user intention based on the user's eye movement, an application function executor configured to execute a function of an application in response to the detected event. The mobile device may further include a display configured to display results of function execution.

19 Claims, 6 Drawing Sheets

APPARATUS AND METHOD FOR PROVIDING INFORMATION BY RECOGNIZING USER'S INTENTIONS

RELATED APPLICATION

This application claims priority from and the benefit under 35 U.S.C. § 119(a) of Korean Patent Application No. 10-2013-0101318, filed on Aug. 26, 2013, in the Korean Intellectual Property Office, the entire disclosure of which is incorporated herein by reference for all purposes.

BACKGROUND

1. Field

The following description relates to a wearable device, a mobile device, and an operating method that provides information by automatically recognizing user's intentions.

2. Description of Related Art

Wearable devices are becoming popular in the next generation computer industry, leading the integration of various industry sectors, and are a new growth industry that creates a higher added value by combining traditional industries with information technology (IT). The wearable devices allow various functions by combining daily necessities, such as watches, glasses, and clothes worn by people, with IT.

A glasses-type wearable device, the device is worn on a user's face, and thus, an input type of a smartphone or a tablet PC is not suitable for the glasses. There is a need for a user input method appropriate for the glasses-type wearable device.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a mobile device, including a sensor configured to sense a user's eye movement, an event detector configured to detect an event by inferring a user intention based on the user's eye movement, an application function executor configured to execute a function of an application in response to the detected event, and a display configured to display result of function execution.

The sensor may include at least one of a camera or an electrooculogram (EOG) sensor.

The event detector may include an intention inferring unit configured to infer a user intention based on the user's eye movement, and a determiner configured to determine whether the inferred intention corresponds to the event.

The intention inferring unit may be further configured to recognize cognitive context based on the user's eye movement, and to infer a user intention based on the recognized cognitive context.

The display may be an eye glass display (EGD).

The device may include a display contents generator configured to generate display content by processing the result of function execution.

The generated display content may include at least one of text, a 2D image, or a 3D image.

The device may include an application executor configured to execute the application based on the user's instruction.

The sensor may be further configured to operate in response to the application being executed.

The mobile device may be included in a glasses-type wearable device.

In another general aspect, there is provided an operating method of a mobile device, including executing an application according to a user's instruction, sensing, at a sensor, a user's eye movement based on the execution of the application, detecting an event by inferring a user intention, executing a function of the application in response to the detected event, and displaying result of function execution.

The detecting may include inferring a user intention based on the user's eye movement, and determining whether the inferred intention corresponds to the event.

The inferring may include recognizing cognitive context based on the user's eye movement, and inferring a user intention based on the recognized cognitive context.

The displaying may include displaying results of function execution on an EGD screen.

The method may include generating display contents by processing results of function execution.

The generated display contents may include at least one of text, a 2D image, or a 3D image.

In another general aspect, there is provided a mobile device, including a sensor configured to sense a user's eye movement, an event detector configured to detect an event by inferring a user intention based on the user's eye movement, an application function executor configured to execute a function of an application in response to the detected event, and an output configured to output result of function execution.

The result of function execution may be output to a display.

The result of function execution may be output to a glasses-type wearable device.

Other features and aspects will be apparent from the following detailed description, the drawings, and the claims.

Figure 1:
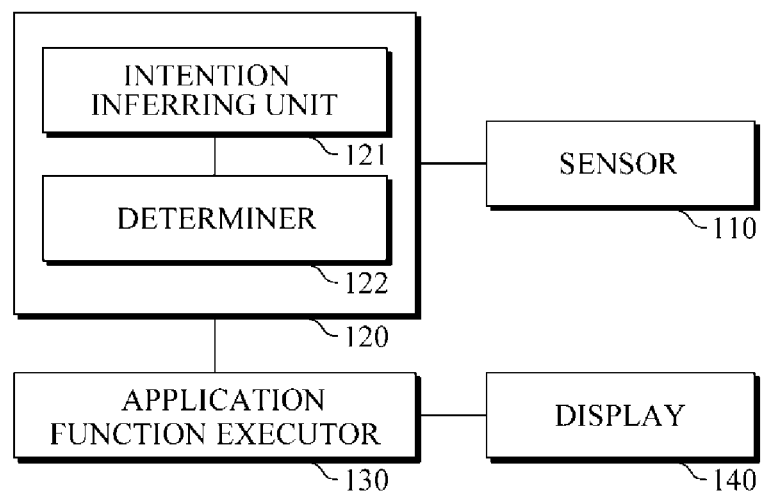
FIG. 1 is a diagram illustrating an example of a mobile device.

Throughout the drawings and the detailed description, unless otherwise described, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

FIG. 1 is a diagram illustrating an example of a mobile device. As a non-exhaustive illustration only, a mobile device described herein may refer to devices such as, for example, a cellular phone, a smart phone, a wearable smart device (such as, for example, a ring, a watch, a pair of glasses, glasses-type device, a bracelet, an ankle bracket, a belt, a necklace, an earring, a headband, a helmet, a device embedded in the cloths or the like), a personal computer (PC), a tablet personal computer (tablet), a phablet, a mobile internet device (MID), a personal digital assistant (PDA), an enterprise digital assistant (EDA), a digital camera, a digital video camera, a portable game console, an MP3 player, a portable/personal multimedia player (PMP), a handheld e-book, an ultra mobile personal computer (UMPC), a portable lab-top PC, a global positioning system (GPS) navigation, a personal navigation device or portable navigation device (PND), a handheld game console, an e-book, and devices such as a high definition television (HDTV), an optical disc player, a DVD player, a Blue-ray player, a setup box, robot cleaners, or any other device capable of wireless communication or network communication consistent with that disclosed herein. The mobile device may be implemented as various devices capable of sensing a user's eye movement.

The wearable device may be self-mountable on the body of the user, such as, for example, the glasses or the bracelet. In another non-exhaustive example, the wearable device may be mounted on the body of the user through an attaching device, such as, for example, attaching a smart phone or a tablet to the arm of a user using an armband, or hanging the wearable device around the neck of a user using a lanyard.

Various applications may be installed in the mobile device, and various types of information may be provided for a user through each installed application. The mobile device may automatically recognize user's intentions based on the user's eye movement, and may provide a user with various types of information suitable for the user's intentions. For example, this information may be provided by automatically executing a function of an application that is running.

For example, while an application that provides a translation service (hereinafter referred to as a translation application) is running, if a user wishes to translate a character that the user is viewing, the mobile device may recognize the intention of a user based on the user's eye movement. Even without any specific instruction from the user, the mobile device may automatically execute a translation function of the translation application to translate the character that the user is viewing, and provide the results for the user.

In another example, while an application that recognizes a person and provides information on the recognized person (hereinafter referred to as a person recognition application) is running, if a user wishes to know about a person that the user is now viewing, the mobile device may recognize the intention of a user based on the user's eye movement. Even without any specific instruction from the user, the mobile device may automatically execute a person recognition function of the person recognition application to recognize the person that the user is viewing, and provide the results for the user.

For ease of explanation, it is assumed that the mobile device is implemented as a glasses-type wearable device. The present disclosure, however, is equally applicable to any of the mobile devices disclosed above.

Referring to FIG. 1, the mobile device 100 includes a sensor unit 110, an event detector 120, and an application function executor 130.

The sensor 110 is configured to sense a user's eye movement. For example, the sensor unit may include devices to sense a user's eye movement, such as, for example, a camera, an electrooculogram (EOG) sensor.

The sensor 110 may operate in conjunction with the execution of an application. The sensor 110 may operate to sense a user's eye movement only when an application is running, so that unnecessary power consumption may be reduced. When the sensor 110 includes various other sensors, it may be predetermined which sensor operates in conjunction with a specific application (hereinafter referred to as a sensor operating in conjunction), and only a predetermined sensor may operate from among various sensors of the sensor 110. The application is an application that provides information to a user after executing application functions, such as, for example, the translation application, and the person recognition application described above.

For example, when the sensor 110 includes a camera and an EOG sensor, and the EOG sensor is predetermined to operate in conjunction with a translation application. Only the EOG sensor may operate when the translation application is running.

The event detector 120 may detect whether an event occurs to execute a function of an application that is running by inferring a user intention. The user's intention may be based on the user's eye movement sensed by the sensor 110.

The event detector 120 may include an intention inferring unit 121 and a determiner 122. The intention inferring unit 121 may infer a user intention based on the user's eye movement sensed BY the sensor 110.

The intention inferring unit 121 may recognize cognitive context of a user based on the user's eye movement sensed by the sensor 110, and may infer a user's intentions based on the recognized cognitive context of the user. The cognitive context includes every aspect that is related to mental information processing, and may include, for example, concentration, engagement, memory, familiarity, interest, or learning.

For example, when a user is viewing a written character, the intention inferring unit 121 may recognize an interest and a reading behavior from the user's eye movement, and may infer that the user intends to read the character that the user is currently viewing (hereinafter referred to as a reading intention).

In another example, when a user is currently viewing a person, the intention inferring unit 121 recognizes familiarity and an interest from the user's eye movement, and may infer that the user intends to know about the person the user is currently viewing (hereinafter referred to as a person recognition intention).

A data of correlation between an eye movement and cognitive context may be stored in the intention inferring unit 121, or in a database provided separately inside the mobile device 100. The database may be used by the intention inferring unit 121 to recognize user's cognitive context.

The determiner 122 may determine whether an intention inferred in the intention inferring unit 121 corresponds to an event for executing a function of an application that is running (hereinafter referred to as function execution event). An intention corresponding to a function execution event may be varied depending on an application. For example, a reading intention may correspond to an event of a translation application, and a person recognition intention may correspond to an event of a person recognition application.

An application function executor 130 may execute a function of a running application in response to a detected event. For example, when a translation application is running, the application function executor 130 may execute a translation function to enable the translation application to translate a character a user is viewing into a predetermined type of character. In another example, when a person recognition application is running, the application function execution unit 130 may execute a person recognition function to enable the person recognition application to recognize a person that a user is viewing, and to provide the user with information on the recognized person.

According to a non-exhaustive example, each application may simply function to notify an application server of event occurrences, in which the application server performs a translation function, a person recognition function, or the like, on behalf of each application, and transmits execution results to each application.

The display 140 may display execution results of application functions. The display 140 may be implemented as an eye glass display (EGD), which includes one-eyed glass or two-eyed glasses, however, other types of displays 140 are considered to be well within the scope of the present disclosure. For example, the display 140 may be implemented as a liquid crystal display (LCD), a light-emitting diode (LED) display, a plasma display panel (PDP), a screen, a terminal, and the like. A screen may be a physical structure that includes one or more hardware components that provide the ability to render a user interface and/or receive user input. The screen can encompass any combination of display region, gesture capture region, a touch sensitive display, and/or a configurable area. The screen can be embedded in the hardware or may be an external peripheral device that may be attached and detached from the apparatus. The display may be a single-screen or a multi-screen display. A single physical screen can include multiple displays that are managed as separate logical displays permitting different content to be displayed on separate displays although part of the same physical screen.

When the display 140 is implemented as an EGD, execution results of application functions may be displayed at an appropriate location on the EGD in a manner that minimizes obstruction of a user's view, based on a position of a user's eyes or on an object position in a screen that a user is viewing. The execution results of a translation application may be data, in which written characters a user is now viewing are translated into predetermined types of characters, and execution results of a person recognition application may be data regarding a person a user is viewing.

Figure 2:
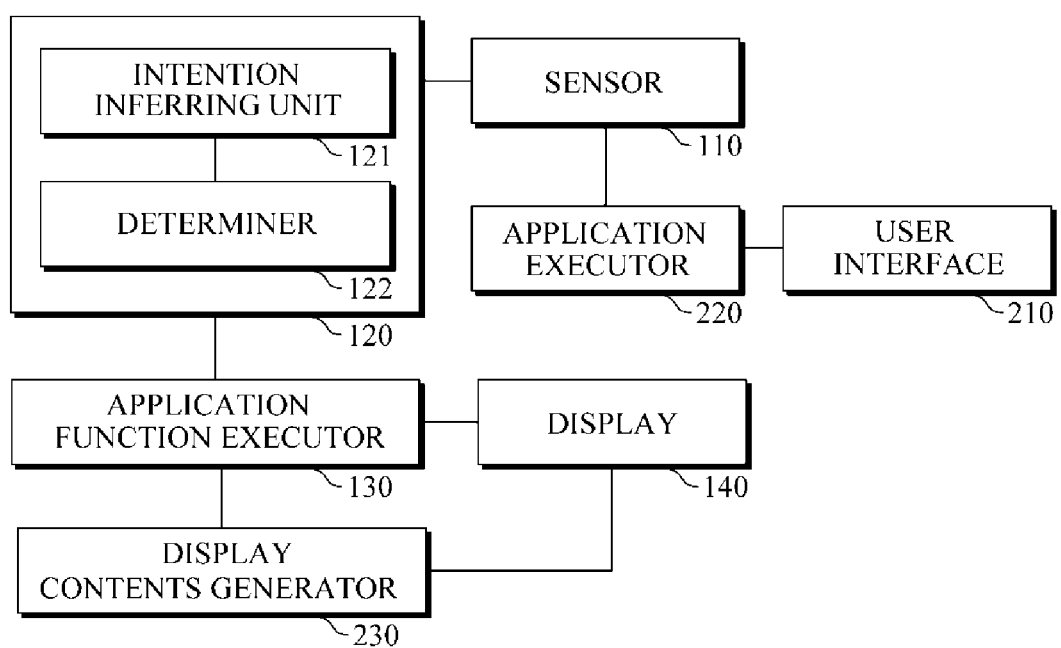
FIG. 2 is a diagram illustrating another example of a mobile device.

FIG. 2 is a diagram illustrating another example of a mobile device. Referring to FIGS. 1 and 2, a mobile device 200 may further selectively include a user interface 210, an application executor 220, and a display contents generator 230, in addition to the component of mobile device 100 in FIG. 1. The above descriptions of FIG. 1 is also applicable to FIG. 2, and is incorporated herein by reference. Thus, the above description may not be repeated here.

The user interface 210 may receive input of instructions for executing an application from a user. The user interface 210 may include a voice recognition device for receiving input of a user's voice instruction, a touch pad or a touch screen, and various sensors for sensing a user's specific operation that corresponds to an instruction for executing an application. The application executor 220 may execute an application according to a user's instruction for executing the application. The sensor 110 may operate in conjunction with the application executor 220 to execute an application. The sensor 110 operates only when a corresponding application is running, such that unnecessary power consumption may be reduced.

The display contents generator 230 may generate display contents by processing results of function execution. For example, the display contents generator 230 may generate display contents, which include texts, 2D images, and 3D images, by processing result data of function execution.

Figure 3A:
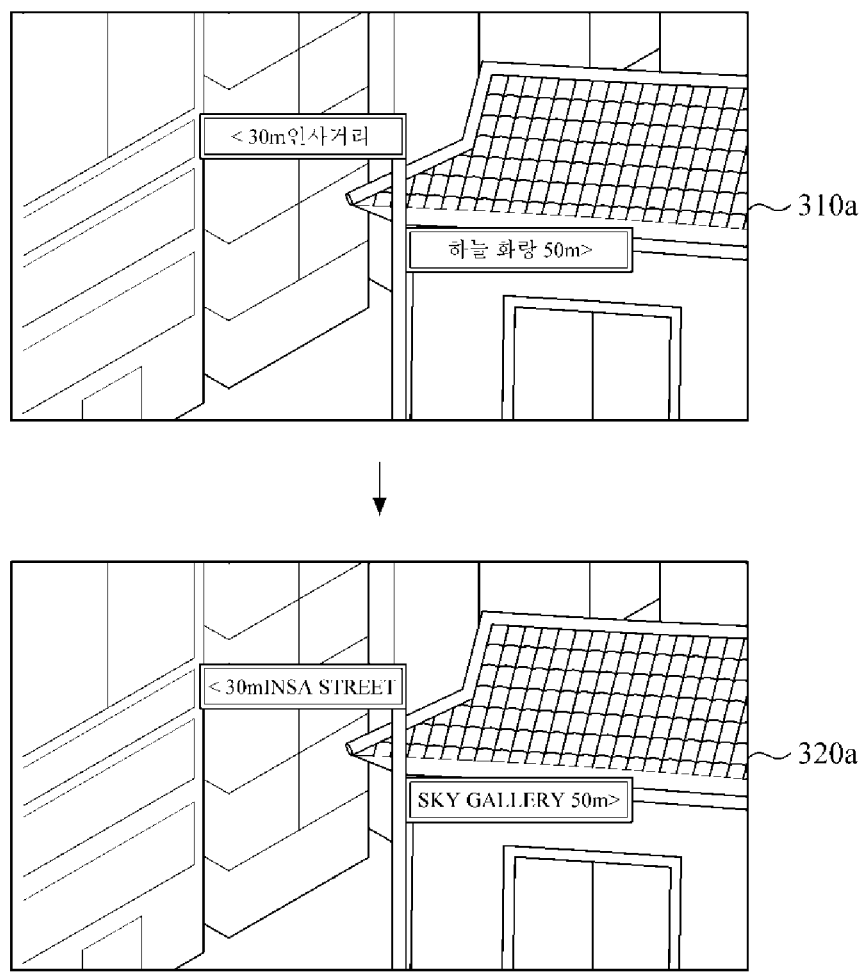
FIGS. 3A and 3B are diagrams illustrating results of executing application functions.
Figure 3B:
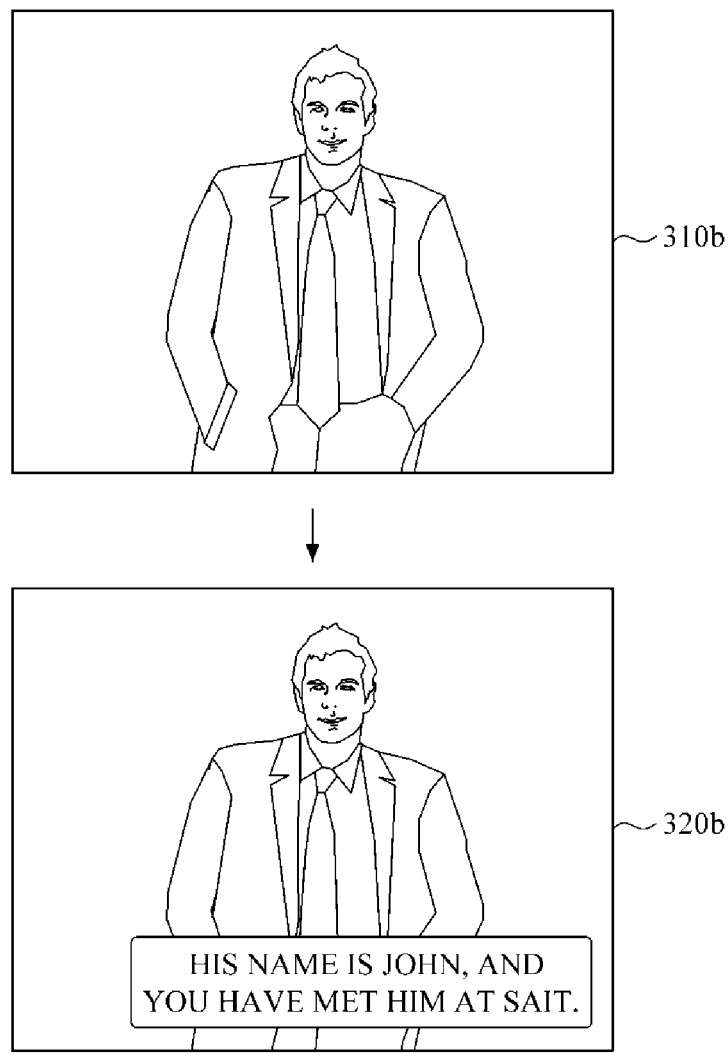

FIGS. 3A and 3B are diagrams illustrating examples of execution results of application functions. FIG. 3A is a diagram illustrating an example of a display of a result of translation function execution of a translation application, and FIG. 3B is a diagram illustrating an example of a display of a result of a person recognition function execution of a person recognition application.

Referring to FIG. 3A, an execution result of a translation function of a translation application is displayed by being overlaid on an EGD screen that a user is viewing. Reference numeral 310*a* denotes an example of an EGD screen before a translation function is executed, and reference numeral 320*a* denotes an example of an EGD screen on which a translation result from Korean into English is displayed.

Referring to FIG. 3B, a result of a person recognition function execution of a person recognition application is displayed on an EGD screen that a user is viewing. Here, reference numeral 310*b* denotes an example of an EDG screen before a person recognition function is executed, and reference numeral 320*b* denotes an example of an EGD screen on which a result of person recognition is displayed. In the example illustrated on FIG. 3B, a name and a meeting place is displayed as a result of person recognition. The information displayed in FIG. 3A are only non-exhaustive illustrations of the types of information that can be displayed as a result of person recognition, and various other types of information associated with a recognized person, such as, for example, age, occupation, last known address, and marital status are considered to be well within the scope of the present disclosure.

Figure 4:
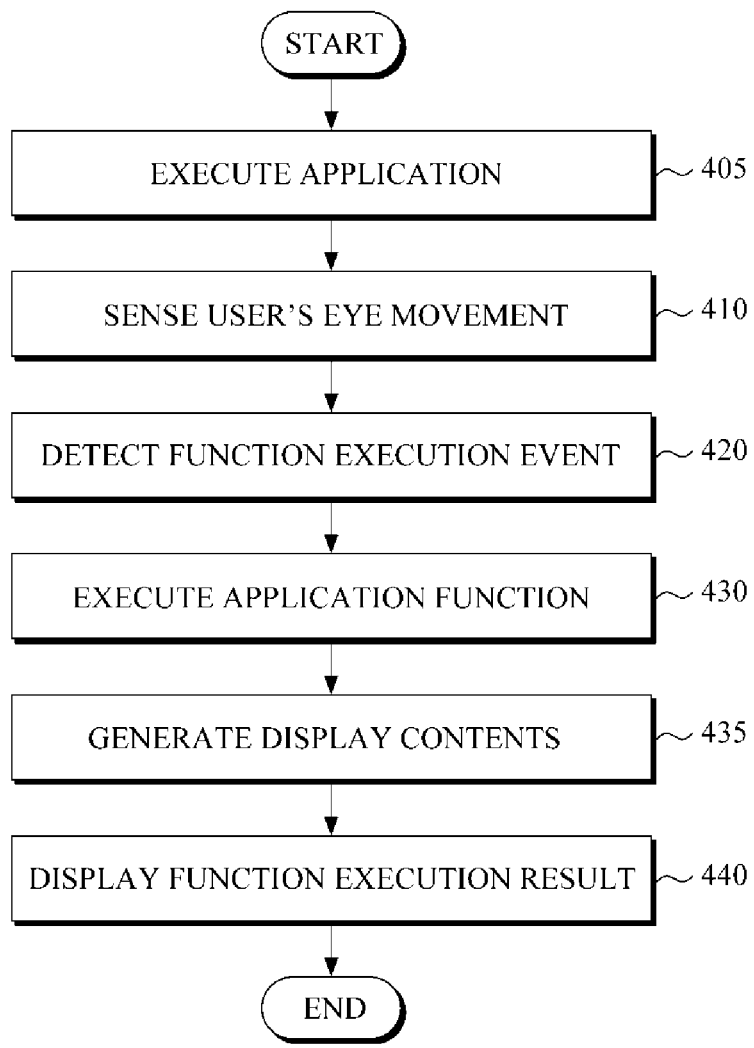
FIG. 4 is a diagram illustrating an example of a method of operating a mobile device.

FIG. 4 is a diagram illustrating an example method of operating a mobile device. The operations in FIG. 4 may be performed in the sequence and manner as shown, although the order of some operations may be changed or some of the operations omitted without departing from the spirit and scope of the illustrative examples described. Many of the operations shown in FIG. 4 may be performed in parallel or concurrently.

Referring to FIG. 4, in 410, an operation method of a mobile device first includes sensing a user's eye movement. For example, a user's eye movement may be sensed using a camera, or an EOG sensor, etc. In a non-exhaustive example, the mobile device senses a user's eye movement only when an application is running, so that unnecessary power consumption may be reduced. In 420, a user intention may be inferred based on the user's eye movement to detect an event for executing a function of an application that is running.

In 430, a function of an application that is running is executed in response to a detected event. For example, when a translation application is running, a translation function is executed, so that the translation application may translate a character that a user is viewing. In another example, when a person recognition application is running, a person recognition function is executed, so that the person recognition application may recognize a person that a user is viewing and provide information on the recognized person.

In 440, a result of application function execution is displayed. For example, execution results of application functions may be displayed at an appropriate location on an EGD screen in a manner that minimizes obstruction of a user's view, based on a position of user's eyes or on an object's position on a screen being viewed.

According to another non-exhaustive example, in 405, a method for executing application functions may further include executing an application according to a user's instruction. By sensing a user's eye movement only when an application is running, unnecessary power consumption of the whole system may be reduced.

According to another non-exhaustive example, in 430, a method for executing application functions may further include generating display contents by processing execution results of application functions. For example, by processing data of function execution results, display contents including, but not limited to, texts, 2D images, and 3D images may be generated.

Figure 5:
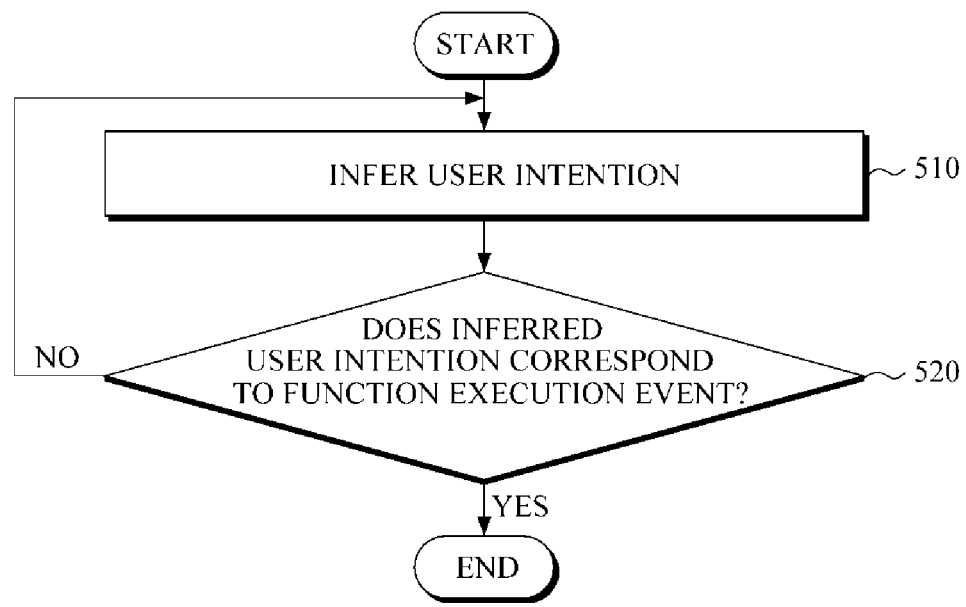
FIG. 5 is a diagram illustrating an example of detecting the event for function execution in 420 in FIG. 4.

FIG. 5 is a diagram illustrating an example of detecting the event for function execution in 420 in FIG. 4. The operations in FIG. 5 may be performed in the sequence and manner as shown, although the order of some operations may be changed or some of the operations omitted without departing from the spirit and scope of the illustrative examples described. Many of the operations shown in FIG. 5 may be performed in parallel or concurrently.

Referring to FIG. 5, the detecting of the function execution event in 420 illustrated in FIG. 4 first includes inferring a user intention based on the sensed eye movement of the user in 510. For example, user's cognitive context may be recognized based on the sensed eye movement, and a user's intention may be inferred based on the recognition.

In 520, it is determined whether an inferred intention corresponds to an event for executing a function of an application that is running.

In response to a determination that the inferred intention does not correspond to an event executing a function of an application that is running, operation 510 is executed. In response to determination that the inferred intention corresponds to an event for executing a function of an application that is running, an operation of detecting a function execution event is terminated.

The processes, functions, and methods described above can be written as a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device that is capable of providing instructions or data to or being interpreted by the processing device. The software also may be distributed over network coupled computer systems so that the software is stored and executed in a distributed fashion. In particular, the software and data may be stored by one or more non-transitory computer readable recording mediums. The non-transitory computer readable recording medium may include any data storage device that can store data that can be thereafter read by a computer system or processing device. Examples of the non-transitory computer readable recording medium include read-only memory (ROM), random-access memory (RAM), Compact Disc Read-only Memory (CD-ROMs), magnetic tapes, USBs, floppy disks, hard disks, optical recording media (e.g., CD-ROMs, or DVDs), and PC interfaces (e.g., PCI, PCI-express, WiFi, etc.). In addition, functional programs, codes, and code segments for accomplishing the example disclosed herein can be construed by programmers skilled in the art based on the flow diagrams and block diagrams of the figures and their corresponding descriptions as provided herein.

The apparatuses and units described herein may be implemented using hardware components. The hardware components may include, for example, controllers, sensors, processors, generators, drivers, and other equivalent electronic components. The hardware components may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The hardware components may run an operating system (OS) and one or more software applications that run on the OS. The hardware components also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a hardware component may include multiple processors or a processor and a controller. In addition, different processing configurations are possible, such a parallel processors.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A mobile device, comprising:
   plural sensors configured to sense eye movements of the user;
   an event detector configured to:
      selectively control which of the plural sensors are used to sense the eye movements of the user based on a determined user operation;
      recognize cognitive context based on the sensed eye movements;
      when the user operation is determined to correspond to object recognition operation, infer whether the user has an object recognition intention, based on the recognized cognitive context using a database storing a predetermined correlation between recognition eye movement and cognitive context for the object recognition operation; and when the user operation is determined to correspond to language translation operation, infer whether the user has a reading intention, based on the recognized cognitive context using a database storing a predetermined correlation between reading eye movement and cognitive context for the language translation operation;

a determiner configured to determine whether the object recognition intention or the reading intention is inferred;

an application function executor configured to:
execute an object recognition function of an object recognition application, as the determined user operation, when the object recognition intention is determined to be inferred in the inferring; and
execute a translation function of a translation application, as the determined user operation, when the reading intention is determined to be inferred in the inferring; and a display configured to display a result of the object recognition function execution or of the translation function execution, wherein the object recognition function enables the object recognition application to recognize an object that a user is viewing, and to provide the user with information on the recognized object.

2. The mobile device of claim 1, wherein the plural sensors comprise an eye capturing camera or an electrooculogram (EOG) sensor.

3. The mobile device of claim 1, wherein the display is an eye glass display (EGD).

4. The mobile device of claim 1, further comprising a display contents generator configured to generate display content by processing the result of the object recognition function execution or of the translation function execution.

5. The mobile device of claim 4, wherein the generated display content comprise at least one of text, a 2D image, or a 3D image.

6. The mobile device of claim 1, further comprising an application executor configured to execute at least one of the object recognition application or the translation application based on instructions of the user.

7. The mobile device of claim 1, wherein the plural sensors are selectively operated to perform the sensing of the eye movements in response to the object recognition application being executed or in response to the translation application being executed.

8. The mobile device of claim 1, wherein the mobile device is included in a glasses-type wearable device.

9. The mobile device of claim 1, wherein the display displays age, occupation, last known address, and marital status of the recognized object as a recognized person, the plural sensors operate to perform the sensing of the sensed eye movements only when the object recognition application or the translation application is running, and the event detector infers whether the user has the reading intention or the object recognition intention based on whether the user is viewing a written character or an object, and the display displays a meeting place of the object.

10. An operating method of a mobile device, comprising:
executing applications according to instructions of a user of the mobile device;
sensing, at plural sensors, eye movements of the user based on the execution of the applications;
selectively controlling which of the plural sensors are used to sense the eye movements of the user based on a determined user operation;
recognizing cognitive context based on the sensed eye movements;
when the user operation is determined to correspond to object recognition operation, inferring whether the user has an object recognition intention, based on the recognized cognitive context using a database storing a predetermined correlation between recognition eye movement and cognitive context for the object recognition operation;
when the user operation is determined to correspond to language translation operation, inferring whether the user has a reading intention, based on the recognized cognitive context using a database storing a predetermined correlation between reading eye movement and cognitive context for the language translation operation;
determining whether the object recognition intention or the reading intention is inferred;
executing an object recognition function of an object recognition application of the applications, as the determined user operation, when the object recognition intention is determined to be inferred in the inferring;
executing a translation function of a translation application of the applications, as the determined user operation, when the reading intention is determined to be inferred in the inferring; and
displaying a result of the object recognition function execution or of the translation function execution,
wherein the object recognition function enables the object recognition application to recognize an object that a user is viewing, and to provide the user with information on the recognized object.

11. The method of claim 10, wherein the displaying comprises displaying results of the object recognition function execution or of the translation function execution on an EGD screen.

12. The method of claim 10, further comprising generating display contents by processing results of the object recognition function execution or of the translation function execution.

13. The method of claim 12, wherein the generated display contents comprise at least one of text, a 2D image, or a 3D image.

14. The method of claim 10, wherein the cognitive context is recognized based on a correlation data between the eye movements and a connective context of the user.

15. The method of claim 10, wherein the sensing is operated to perform the sensing of the eye movements only in response to the applications being executed.

16. A mobile device, comprising:
plural sensors configured to sense eye movements of the user;
an event detector configured to:
selectively control which of the plural sensors are used to sense the eye movements of the user based on a determined user operation;
recognize cognitive context based on the sensed eye movements;
when the user operation is determined to correspond to object recognition operation, infer whether the user has an object recognition intention, based on the recognized cognitive context using a database, storing a predetermined correlation between recognition eye movement and cognitive context for the object recognition operation; and when the user operation is determined to correspond to language translation operation, infer whether the user has a reading intention, based on the recognized cognitive context using a database storing a predetermined correlation between reading eye movement and cognitive context for the language translation operation;

a determiner configured to determine whether the object recognition intention or the reading intention is inferred;

an application function executor configured to:

execute an object recognition function of an object recognition application, as the determined user operation, when the object recognition intention is determined to be inferred in the inferring; and execute a translation function of a translation application, as the determined user operation, when the reading intention is determined to be inferred in the inferring; and an output configured to output a result of the object recognition function execution or of the translation function execution, wherein the object recognition function enables the object recognition application to recognize an object that a user is viewing, and to provide the user with information on the recognized object.

17. The mobile device of claim 16, wherein the result of the object recognition function execution or of the translation function execution is output to a display.

18. The mobile device of claim 16, wherein the result of the object recognition function execution or of the translation function execution is output to a glasses-type wearable device.

19. The mobile device of claim 16, wherein the plural sensors perform respective sensings of the sensed eye movements only in response to either the object recognition application being executed or the translation application being executed.

* * * * *